United States Patent [19]

Kohmura et al.

[11] 4,032,690

[45] June 28, 1977

[54] THERMOSENSITIVE RECORDING MATERIAL

[75] Inventors: Isao Kohmura, Nagaokakyo; Yukio Tahara, Takasago; Kiyoshi Futaki; Hiroshi Tange, both of Nagaokakyo, all of Japan

[73] Assignee: Mitsubishi Paper Mills, Ltd., Tokyo, Japan

[22] Filed: Jan. 24, 1975

[21] Appl. No.: 544,007

[52] U.S. Cl. ................................ 428/263; 428/488; 427/145; 427/151; 428/486; 428/513; 428/533; 428/535; 428/536; 428/537; 428/913

[51] Int. Cl.[2] ...................... B41M 5/18; B32B 9/06

[58] Field of Search .......... 428/913, 263, 290, 486, 428/488, 513, 533, 535, 536, 537; 427/148, 151, 145

[56] References Cited

UNITED STATES PATENTS

| | | | |
|---|---|---|---|
| 3,445,261 | 5/1969 | Talvalkar | 428/913 |
| 3,539,375 | 11/1970 | Baum | 428/913 |
| 3,561,991 | 2/1971 | Baum | 428/913 |
| 3,674,535 | 7/1972 | Blose | 428/913 |
| 3,895,173 | 7/1975 | Adachi | 428/913 |
| 3,955,025 | 5/1976 | Matsukawa | 428/323 |

*Primary Examiner*—Ellis Robinson
*Attorney, Agent, or Firm*—Cushman, Darby & Cushman

[57] ABSTRACT

Thermosensitive recording material for use in thermal printing, which is composed of a coating composition applied on a support, which coating composition comprises (a) a chromogenic compound, (b) an organic acid, (c) a water-soluble binder containing a carboxyl group and having a softening point of 200° C or higher, (d) a filler, (e) a metal salt of a higher fatty acid and (f) a wax, said recording material having a Bekk surface smoothness of 100 to 500 seconds.

19 Claims, No Drawings

THERMOSENSITIVE RECORDING MATERIAL

This invention relates to a thermosensitive recording material comprising as active ingredients a chromogenic compound and an organic acid capable of developing color by reacting with said chromogenic compound when heated. The invention provides a thermosensitive recording material excellent for practical use in not only reproduction and hot-pen recording, but also thermal printing in general.

It has heretofore been known to manufacture a thermosensitive recording paper, as disclosed in Japanese Patent Publication No. 14,039/70, by coating a supporting material with a composition comprising a chromogenic compound such as Crystal Violet Lactone and a bisphenol such as bisphenol-A dispersed in a binder.

There are currently available thermographic copying paper, hot-pen recording papers for use in electrocardiography and industrial recording and thermal-printing recording papers for use in electronic calculators and terminal equipments of a standard electronic computers. A thermosensitive recording paper is generally required to develop color by short time heating, not to develop color by pressure, and to be resistant to water. Besides, particularly for a thermosensitive recording paper to be used in thermal printing, there are more severe requirements concerning the matching with a thermal head, to prevent (1) sticking, (2) residue and (3) abrasion of the head. Explanation is given below with respect to these three points.

The types of thermal head include Silicone IC type developed by Texas Instrument Co., thick-film type developed by NCR Co., and thin-film type developed by Hewlett Packard Co. All of these types employ a protective coating of SiO, $Al_2O_3$, $SiO_2$, or Si, which is to be abraded after a long printing period owing to friction between the thermosensitive recording paper and the thermal head. Such abrasion of the head is one of the major problems in view of life of the thermal head.

A great majority of thermal printers operate on non-impact principle because of silent printing, though impact printing is used in some cases. Generally in non-impact printing, the thermal head is heated by an electric pulse current, the heat being transferred to the thermosensitive recording paper and after the head has been cooled, the recording paper or the head is shifted with sliding motion. Accordingly, during heating, the thermosensitive recording paper and the thermal head are kept in contact with each other and some of the ingredients of the thermosensitive composition are in molten state. The molten ingredients solidify when removal of the thermal head from the thermosensitive recording paper is to take place. Sticking is a phenomenon of adhesion of the solidified ingredients to the thermal head, which interferes with feeding of the recording paper. Sticking occurs with a thermal head of the dot matrix type, and more easily in the case of seven-bar segment type because of larger printing face. When this phenomenon occurs, not only the paper feeding becomes difficult, but also the head becomes overheated, resulting in reduced life of the head. Therefore, elimination of sticking is important for the thermosensitive recording paper for use in thermal printing.

As for the residue, it is formed as a result of sticking phenomenon or from dusts generated from scraped surface layer of the thermosensitive recording paper having insufficiently binded thermosensitive coating composition. When occured on the thermal head, the residue causes uneven printing, resulting in blurred color image developed on recording.

Explanation of the thermal head is given below.

The thermal head currently in practical use is that for a dot printing system using, for example, a 5 × 7 dot matrix. Although excellent in print quality, this system involves complex electric circuiting. To avoid such complexity, many thermal head suppliers are developing a seven-bar segment system. Although inferior in print quality, the seven-bar segment system is expected to be widely used in future in the printing system of electronic calculator. As compared with the dot matrix system, in the seven-bar segment system, more severe performance characteristics are required for the thermosensitive recording paper. It is needless to say that thermosensitive recording paper suitable for use in the seven-bar segment system can also be used in the dot matrix system.

As mentioned above, more severe performance characteristics are required for the thermosensitive recording paper for use in thermal printing, as compared with thermosensitive copying paper or the recording paper for use in hot-pen recording.

Various attempts have heretofore been made to improve the aforesaid disadvantages of the conventional thermosensitive recording paper. For example, in Japanese Patent Application Laid-open ("Kokai") No. 2,793/72, NCR Co. proposed to improve the thermosensitive paper by dispersing Crystal Violet Lactone and a bisphenol in polyvinyl alcohol (PVA) used as binder and further adding a filler, lubricant, and non-tacky wax. In Japanese Patent Application Laid-open ("Kokai") No. 76,548/73, Ing. C. Olivetti and C. SpA proposed a thermosensitive paper comprising a dispersion of a basic color former and an acidic compound in a nonionic cellulose ether used as binder, into which fillers such as talc and clay, lubricating agents such as metal stearates and abrasing agents such as waxes can be incorporated. In Japanese Patent Application Laid-open ("Kokai") No. 32,646/74 and No. 36,343/74, the present inventors proposed to impart water resistance to the thermosensitive paper by adding an epoxy- or ethylenimine-type hardener to a system comprising a chromogenic compound, a phenolic compound capable of developing a color image by reacting with the chromogenic compound when heated, and a water-soluble binder, and also disclosed the effect of adding fillers such as talc, clay, and powdered starch and waxes. In another Japanese Patent Application Laid-open ("Kokai") No. 60,744/74, the present inventors proposed to improve the color-developing property of thermosensitive paper by increasing the surface smoothness and also disclosed the effect of fillers and waxes.

In spite of many improvements proposed as mentioned above, the present inventors found that thermosensitive paper is not sufficiently improved for use in thermal printing by applying said proposals. The improved thermosensitive paper according to Japanese Patent Application Laid-open ("Kokai") No. 2,793/72 is not satisfactory from the standpoint of sticking, particularly for use with a thermal head of the seven-bar segment type which is easily subject to sticking. Moreover, owing to the presence of a hard inorganic substance used as filler material, this thermosensitive paper enhances abrasion of the thermal head. The same applies to the thermosensitive paper proposed in Japanese Patent Application Laid-open ("Kokai") No. 76,548/73. Moreover, the nonionic binder used in this patent application is required to be of a polymer having a relatively high molecular weight in order to exhibit sufficient binding strength. When such a high-molecular-weight polymer is used, viscosity of the resulting coating composition becomes too high to be used in practice. The thermosensitive paper disclosed by the present inventors in Japanese Patent Application Laid-open ("Kokai") No. 32,646/74, No. 36,343/74, or No. 60,744/74 is also not satisfactory with respect to sticking, particularly for use with a thermal head of the seven-bar segment type which is easily subject to sticking.

An object of this invention is to eliminate the aforesaid major defects of a thermosensitive material fur use in thermal printing, that is, (1) sticking, (2) residue, and (3) abrasion of the head. It is necessary, however, to pay attention to various aspects of the problem in order to achieve the object without deteriorating those essential characteristics of the thermosensitive material, including sufficient color density, absence of pressure-sensitivity, sufficient shelf life, and moderate temperature of color development, which are prerequisite to all thermosensitive materials for use in not only thermal printing but also reproduction and hot pen-recording.

Another object of this invention, therefore, is to level up all of these essential characteristics prerequisite to a thermosensitive material and, at the same time, to eliminate the defects including (1) sticking, (2) residue, and (3) abrasion of the head from a thermosensitive material for use in thermal printing.

As a result of extensive investigations on the thermosensitive recording materials for use in thermal printing, the present inventors have succeeded in developing an excellent thermosensitive recording material for use in thermal printing, which is composed of a coating composition applied on a supporting material, which coating composition comprising (a) a chromogenic compound, (b) an organic acid, (c) a water-soluble binder containing a carboxyl group and having a softening point of 200° C. or higher, (d) a filler, (e) a metal salt of a higher fatty acid, and (f) a wax, said recording material having a Bekk surface smoothness of 100 to 500 seconds.

Advantages of each ingredient used in this invention are explained below in detail.

Elimination of three major defects of (1) sticking, (2) residue, and (3) abrasion of the head can never be accomplished simply by the individual effect of each ingredient of the present thermosensitive composition. The improvement contributed by the individual ingredient is so small that when tested by using a thermal printer of the seven-bar segment type, at most a small degree of improvement is observed in the performance characteristics. To the contrary, when the present combination of ingredients is used, the overall effect is surprising and the performance of the thermosensitive material is improved to such a degree that no residue build-up on the head and very little abrasion of the head, were observed after a long-run printing of several tens of million of letters by use of a thermal head supplied by Displaytek Co. Furthermore, regarding the sticking, no noise which is caused peculiarly when paper and head are torn due to sticking occurs and paper can fully stand long-run printing. Thus, the synergestic effect of the combination of ingredients is very great as will be apparent from Examples given later.

The primary characteristic feature of this invention is elimination of sticking without deteriorating other thermosensitive characteristics. As mentioned earlier, in order to prevent sticking, it is necessary to use either or both of the infusible substance and the fusible substance which does not become sticky in fused state or in solidified state after having been fused. The chromogenic compound and the organic acid capable of forming color by reacting with the chromogenic compound when heated are indispensable ingredients of the thermosensitive composition and color is formed when contact is made between both ingredients after either of them (generally the organic acid) has been fused. The molten organic acid becomes sticky. In order to reduce the stickiness, it is necessary to select proper types of the infusible substance and the fusible but nonsticky substance and proper ratio between them. In preventing sticking of the thermosensitive material, the ingredients selected according to this invention contribute not only individually but also synergestically when used in combination according to this invention.

The invention is disclosed below in detail.

In this invention, a water-soluble binder containing a carboxyl group which does not soften below 200° C. was selected. In order to be effective, the binder is required to have a high binding strength. A substance of high binding strength, however, tends usually to become sticky when softened. A binder which softens below 200° C. markedly enhances sticking. Accordingly, a binder which does not soften when heated in contact with the thermal head is desirable. On the other hand, thermosensitive paper should be resistant to water in order to improve the commercial value. A binder containing a carboxyl group can be easily made water resistant. An ammonium salt, for example, becomes water-insoluble by liberating ammonia when heated. Sodium salts, etc. can easily be made water-resistant in the presence of a water proofing agent containing epoxy groups. Water-resistant thermosensitive paper is desirable to improve not only the commerical value but also the sticking.

The filler used in this invention is infusible and is effective for preventing the sticking. Among the fillers, a softer one is preferred because of less abrasion of the thermal head.

The metal salt of higher fatty acid used in this invention melts on heating to form a nonsticky liquid and acts as a lubricating agent when solidified. It is nonsticky and, in addition, effectively reduce stickiness of the organic acid and the chromogenic compound.

The waxes used in this invention not only plays the same role as that of the metal salt of higher fatty acid, but also effectively prevents color development due to pressure. Among a variety of waxes including higher fatty acids waxes, higher fatty acid amide types, and petroleum waxes, the wax of the higher fatty acid amide types are preferred for the reason of increasing the color density. Owing to the presence of acid-amide linkages, a wax of the higher fatty acid amide type can be made to adhere to the supporting material by use of the water-soluble binder and contribute to reduce the residue build-up on the head. Beside the primary effect of increasing color density, the was has favorable effect on surface smoothness of the thermosensitive material, prevention of residue build-up on the head, and reduction of wear of the head.

As mentioned above, the ingredients of the present thermosensitive composition contribute to the performance characteristics not only individually but also synergestically when used in combination according to this invention. A thermosensitive composition particularly excellent in eliminating the defect of sticking contains 30 to 300% by weight (based on total amount of (a) the chromogenic compound and (b) organic acid, both being the essential color-forming ingredients) of (d) infusible fillers, 10 to 200% by weight (on the same basis) of fusible but nonsticky (e) metal salt of a higher fatty acid and (f) waxes, and 15 to 50% by weight (based on total solids) of a (c) binder not softened by heat, and has a Bekk surface smoothness of 100 to 500 seconds. When the ratio between (e) the metal salt of a higher fatty acid and (f) the waxes are in the range from 1/10 to 10/1, the composition is particularly excellent in color density and prevention of color formation due to pressure.

The chromogenic compounds for use in this invention are those having a lactone, lactam, sultone, or spiropyrane ring and capable of developing color by reacting with an organic acid when heated. Typical but nonlimitative examples of such compounds are Crystal Violet Lactone,
Malachite Green Lactone,
3,3-bis(p-Dimethylaminophenyl)-6-aminophthalide,
3,3-bis(p-Dimethylaminophenyl)-6-(p-toluenesulfamido) phthalide
3-Diethylamino-7-(N-methylanilino)-fluorane,
3-Diethylamino-7-(N-methyl-p-toluidino)-fluorane,
3-Dimethylamino-6-methoxyfluorane
3-Diethylamino-7-chlorofluorane
3-Diethylamino-6-methyl-7-chlorofluorane,
3-Diethylamino-7-phenylfluorane,
3-Morpholino-5,6-benzofluorane,
3-Diethylamino-5-methyl-7-dibenzylaminofluorane,
3-Diethylamino-6-methyl-7-anilinofluorane,
3-Piperidino-6-methyk-7-anilinofluorane,
3-Methyl-p-ethylphenylamino-7-methylphenylamino-fluorane,
3-Diethylamino-7-dibenzylaminofluorane,
3-Diethylamino-7,8-benzofluorane,
3-Cyclohexylamino-6-chlorofluorane,
N-phenyl-Rhodamine-β lactam,
Acid Rhodamine B sultone,
Benzo-β-naphthospiropyrane,
2-Methylspirobinaphthopyrane, and
1,3,5-Trimethyl-6′-chloro-8′-methoxyindolinobenzospiropyrane.

The organic acids for use in this invention are those which melt and/or vaporize at room temperature or higher temperaures, preferably 70° C. or higher, and react with a chromogenic compound to develop color. Examples of such organic acids include phthalic anhydride, gallic acid, salicylic acid, 4,4′-isopropylidenediphenol, 4,4′-isopropylidemebis(2-chlorophenol), 4,4′-isopropylidenebis(2-tert-butylphenol), 4,4′-sec-butylidenediphenol, 4,4′-(1-methyl-n-hexylidene)diphenol, 4,4′-cyclohexylidenediphenol, 4,4′-thiobis(6-tert-butyl-3-methylphenol), 4-phenylphenol, 4-hydroxydiphenoxide, methyl-4-hydroxybenzoate, phenyl-4-hydroxybenzoate, 4-hydroxyacetophenone, salicyl anilide, novolak-type phenolic resins, halogenated novalak-type phenolic resins, α-naphthol, and β-naphthol. Among these compounds, those phenolic compounds which have two or more hydroxyl groups in their molecule are particularly suitable for the present purpose. These organic acids can be used in mixtures of two or more.

The water-soluble binders containing carboxyl groups and having a softening point of 200° C. or higher include sodium, ammonium, potassium, or ethanolamine salt of styrene-maleic anhydride copolymers, carboxyl-modified starches, carboxymethylcelluloses, etc. the softening point of a water-soluble binder was measured on a specimen in the form of film which was prepared from an aqueous solution of the binder and conditioned at 20° C. and 60% RH, because the softening point of a water-soluble binder depends largely on its moisture content, hence on relative humidity. The softening point masured in this way approximates that of the binder in thermosensitive paper. According to some of the measurements conducted by the present inventors, sodium salt of a styrene-maleic anhydride copolymer, a carboxymethylcellulose, and a carboxyl-modified starch did not soften at 200° C., whereas such binders as a casein dissolved in ammonia and ammonium nitrate solution, carboxyl-modified styrene-butadiene latex, ammonium salt of a partial methyl ester of a styrene-maleic anhydride copolymer, a polyvinyl alcohol, and gelatine softened at 200° C. and showed stickiness. In order to adjust various factors such as binding strength, coating characteristics, etc., it is feasible to use the above-noted nonsticky water-soluble binders in mixtures or in combinations with other water-soluble binders such as hydroxyethylcelluloses, polyvinyl alcohol, gum arabic, etc., so far as no sticking will occur. The binders for use in this invention can be made water-resistant with such water-proofing agents as 1,2-bis(2,3-epoxypropoxy)ethane having two or more 1,2-epoxy rings in the molecule and 1,6-hexamethylene-diethyleneurea having two or more ethylenimine groups in the molecule.

The fillers to be used in this invention are required to be infusible. Such fillers are generally known as coating fillers including inorganic fillers such as talc, clay, calcium carbonate, etc., and finely powdered starches and others. The latter are preferred because of reduced abrasion of the head. The finely powdered starches include those manufactured from corn, potato, sweet potato, cassava root, sago, wheat, and rice; oxidized starches prepared by oxidizing above-listed starches with sodium hydrochlorite or the like; esterified starches represented by acetylstarch; etherified starches represented by methylstarch; and other starch derivatives such as dialdehyde starch and aminated starch. Ordinary starch is insoluble in cold water but swells in hot water until it forms a jelly. Since the effect of starch used in this invention is manifested by the starch in the form of fine powder, it should not dissolve in the medium during the course of manufacturing the thermosensitive recording material and its addition to the composition is conducted preferably at room temperature or lower temperatures. Since the starch is used in the present invention as a dispersion in water, its particle diameter if preferably as small as 0.1 to 100 μ, particularly 1 μ to 50 μ.

The metal salts of higher fatty acids for use in this invention are zinc, calcium, iron, cobalt, nickel, aluminum, manganese, lead, sodium, and potassium salts of higher fatty acids, such as stearic acid, oleic acid, palmitic acid, and the like. In view of manufacture, keeping quality, and coloring of back ground, water-insoluble polyvalent metal salts are preferred. Polyvalent metal salts of stearic acid are particularly preferred from the economical standpoint.

The waxes for use in this invention include animal waxes such as beeswax and shellac; vegetable waxes such as carnauba wax; petroleum-based waxes such as paraffin waxes, microcrystalline wax, and polyethylene waxes; and synthetic waxes such as higher fatty acids, polyhydric alcohol esters of higher fatty acids, higher ketones, higher amines, higher fatty acid amides, and condensation products of higher fatty acids and amines. These waxes are used in the form of fine powder or emulsion, and should be solid at ordinary temperature, preferably having a melting or softening point of 40° C. or higher. They should be nonsticky. Particularly preferred are waxes of the higher fatty acid amide type and petroleum-based waxes. They have a melting point in the range preferably from 60° to 150° C. Typical examples are stearamide, linoleinamide, laurylamide, myristylamide, palmitamide, oleylamide, methylolated derivatives of fatty acid amides, methylenebisstearamide, and ethylenebisstearamide. These amide waxes can be used also in mixtures. They include paraffin waxes having a melting point from 42° to 73° C., microcrystalline waxes having a melting point from 50° to 120° C., and polyolefin waxes such as polyethylene waxes and polypropylene waxes. The polyolefin waxes for use in this invention are ordinary polyolefin waxes having a molecular weight of 1,000 to about 10,000, which are produced by high pressure or low pressure polymerization (low density polyolefin or high density polyolefin respectively), or by cracking of a high molecular weight polyolefin. Easily emulsifiable waxes derived from these petroleum-based waxes by oxidation to introduce polar groups such as hydroxyl, ester, carboxyl, aldehyde, and peroxide groups can also be used. Waxes can be used in mixtures to lower the softening point or to improve the handling quality. It is preferable to use a petroleum-based wax having a melting point of ordinary temperature or higher, preferably 40° C. or higher. When single wax is to be used, a wax of the fatty acid amide type is most preferred, while when prevention of color development due to pressure is strongly desired, joint use of a wax of the fatty acid amide type and a petroleum-based wax is peferred because of enhanced effectiveness.

One of the characteristic features of the thermosensitive recording material of this invention is the specified surface smoothness. If the smoothness is insufficient, surface irregularities cause a decrease in color density and enhance sticking, reduces buildup on the head, and abrasion of the head. Therefore, the smoothness should be in the range from 100 to 500 seconds in terms of Bekk smoothness. If the surface becomes too smooth beyond the limit given above, the thermosensitive recording material becomes too slippery, causing deteriorated appearance and undesirable slipping during printing, although none of the aforesaid troubles will be encountered. Since a thermosensitive recording material coated by means of an air-knife coater or a blade coater has a Bekk smoothness of about 10 to 50 seconds, it should be after-treated by machine calendering or supercalendering to improve the smoothness. A thermosensitive material improved in smoothness by such a treatment to attain a value in the specified range acquires excellent performance characteristics.

A brief explanatory description is given below concerning the testing method for Bekk smoothness. The test was conducted in accordance with JIS P 8119 "Testing Method for Smoothness of Paper and Paperboard by Bekk Tester," which is based on the resistance against air flow over surface irregularities. The test was carried out in the air at 20° C. and 65% RH. The test specimen was placed on a circular support bearing an optical-flat glass surface having at the center a circular hole, through which the leaked air passes into the vacuum chamber. A rubber disc having smooth surface was placed on the test specimen and a load of 1 kg/cm$^2$ was applied on the rubber disc.

A vacuum pump was actuated and the time required for the mercury column to descend from 380 mm to 360 mm was measured. The longer the time, the better is the smoothness.

The ingredients of the present thermosensitive composition are dispersed in an aqueous solution containing a binder. It is desirable to grind dispersed particles of the ingredients by means of a grinder such as ball mill to a particle size as fine as several microns or smaller. The metal salt of a higher fatty acid and the wax can be added either as a dispersion or an emulsion using an emulsifier. A surface active agent such as dispersing agent or defoamer can be used, if necessary, as grinding aid. A surface active agent can also be used, if necessary, to improve the coating performance.

The supporting material for use in this invention is generally paper. A synthetic resin film or a textile cloth can also be used.

The quantity to be used of each ingredient depends on the type of binder, organic acid, filler, metal salt of higher fatty acid, and waxes. For one part of the chromogenic compound, 1 to 20 parts of the organic acid are necessary. As mentioned before, proportions of other ingredients to the essential thermosensitive ingredients comprising the chromogenic compound and the organic acid are very important, The amount of a binder is 15 to 50% by weight based on total solids content, the amount of a filler is 30 to 300% by weight based on total essential ingredients, and the sum of metal salt of higher fatty acid and waxes is 10 to 200% by weight on the same basis. The ratio of fatty acid metal salt to waxes is preferably from 1/10 to 10/1 by weight. If a ratio outside the range is used, the balance among the ingredients becomes out of order, resulting in troubles. When a combination of waxes is used, the ratio of the fatty acid amide wax to the petroleum-based wax is preferably 1/9 to 9/1 by weight.

Typical Examples are given below to illustrate the invention in detail.

Example 1

| | |
|---|---|
| Liquor A | |
| Crystal Violet Lactone (CVL) | 4 g |
| 5-% Aqueous solution of styrene-maleic anhydride copolymer sodium salt ("Malon MS-20", trade name of Daido Kogyo Co.) | 4 g |
| Water | 8 g |
| Liquor B | |
| 4,4'-Isopropylidenediphenol (Bisphenol-A) | 19 g |
| Calcium stearate | 7 g |
| Stearamide | 15 g |
| 5-% Aqueous solution of Malon MS-20 | 41 g |
| Water | 82 g |

The liquors A and B were separately ground in a ball mill for 2 days to disperse the ingredients. The ground liquors A and B were thoroughly mixed with 74 g of 20-% aqueous solution of Malon MS-20 and 76 g of 50-% aqueous dispersion of wheat starch, to prepare a thermosensitive coating composition. The coating composition was applied on a sheet of papers having a basis weight of 50 g/m$^2$ at an application rate of 0.3 g/m$^2$ in terms of CVL. The sheet was dried and treated by means of a super-calender to obtain thermosensitive recording paper having a Bekk smoothness of 150 seconds. The recording paper was white in ground color and fully developed a blue color of high density at about 90° C. It was resistant to pressure development of color so that no color was formed when scratched by the nail. It showed sufficient thermal stability to endure storage at 50° C. for 1 month. The sticking was as low as 110 g and no sticking was observed when printed by means of a thermal priner of the seven-bar segment type. A long run test was carried out by using a thermal head DC-1157 (a dot matrix recording type) made by Displaytek Co. Neither abrasion of the head nor residues on the head was observed after printing of 50,000,000 letters. Thus, the performance characteristics of the present thermosensitive recording paper were found to be quite excellent.

Note: Measurement of the sticking was carried out by use of a thermal head EPN-2100 (5 × 4 matrix) made by Texas Instrument Co. under the following conditions: pressing pressure, 600 g/cm$^2$ (with a felt padding); voltage, 15 V; width of input pulse to heat element, 11 msec × 5 lines; all dots were actuated. After having been released of the pressing pressure, the head was cooled to room temperature and the force required to separate the head from the recording paper was measured by means of a spring balance. The greater the force required, the larger was the sticking. The experimental results obtained by the present inventors revealed that a thermosensitive paper which showed a separating force of less than 150 g was satisfactorily usable with a seven-bar segment-type head which is easily subject to sticking; a thermosensitive paper which required a separating force of 150 to 200 g is usable with a dot matrix-type head which is less subject to sticking as compared with a seven-bar segment type, but cannot be used with a seven-bar segment-type head which is easily subject to sticking, and hence such a recording paper has a narrow range of uses; a thermosensitive paper which required a separating force of greater than 200 g was not usable in a thermal printer.

EXAMPLES 2 to 4

Various types of thermosensitive recording paper were obtained in the same manner as in Example 1, except that the type and proportion of each ingredient and the smoothness of the recording paper were varied as shown in Table 1. The results of tests were also shown in Table 1. Among the experiments covering run No. 1 to run No. 16, No. 1, No. 2, and No. 3 (corresponding to Example 2, 3, and 4, respectively) were carried out according to this invention, but other experiments were carried out not conforming to this invention. In all experiments except for run No. 14, the amount of a binder used was 17% by weight based on total solids content. As is seen from Table 1, it was found that the thermosensitive recording paper of this invention satisfactorily meets nearly all of the requisite performance characteristics and can be satisfactorily used in thermal printing.

A long-run printing test was carried out on the samples No. 1, No. 2, and No. 3 by use of a thermal head DC-1157 (a dot matrix recording type) made by Displaytek Co. No abrasion of the head and no residue on the head were observed after printing of 50,000,000 letters. No sticking was observed when the same samples were tested by use of a thermal printer of the seven-bar segment type.

The sample No. 6 showed a great degree of sticking and a loud noise characteristic of sticking was heard when the head was separated from the recording paper. The head was damaged after printing several thousands of letters.

The sample No. 11 showed marked sticking so that printing became impossible after several tens of letters had been printed.

The sample No. 14 showed a great deal of residue on the head so that printing became no more possible due to deteriorated print quality after several hundreds of thousand of letters had been printed by use of a thermal head DC-1157.

When a high-molecular-weight cellulose ether such as hydroxyethylcellulose was used as the water-soluble binder to increase the binding strength, the resulting coating composition became too viscous to be used in preparing thermosensitive recording paper.

Table 1

| | Run and sample No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | | Within the scope of this invention | | | Not within the scope of this invention | | | | | | | | | | | | |
| (a) | CVL | 4 | 4 | 4 | 4 | 4 | 4 | 4 | 4 | 4 | 4 | 4 | 4 | 4 | 4 | 4 | 4 |
| (b) | Bisphenol-A | 19 | 19 | 19 | 19 | 19 | 19 | 19 | 19 | 19 | 19 | 19 | 19 | 19 | 19 | 19 | 19 |
| (c) | Malon MS-20 | 17 | — | 17 | 17 | — | — | — | — | — | — | 9.2 | 15.6 | 14 | 10 | 12.9 | 12.9 |
| | Carboxyl-modified starch | — | 17 | — | — | — | — | — | — | — | — | — | — | — | — | — | — |
| | PVA | — | — | — | — | 17 | — | — | — | 17 | 17 | — | — | — | — | — | — |
| | Casein | — | — | — | — | — | 17 | — | — | — | — | — | — | — | — | — | — |
| | Styrite CM-1 | — | — | — | — | — | — | 17 | — | — | — | — | — | — | — | — | — |
| | SBR (Dow 636) | — | — | — | — | — | — | — | 17 | — | — | — | — | — | — | — | — |
| (d) | Clay | — | — | 38 | — | — | — | — | — | 38 | 38 | — | — | — | — | — | — |
| (d) | Wheat starch | 38 | 38 | — | 38 | 38 | 38 | 38 | 38 | — | — | — | 38 | 38 | 38 | 5 | 38 |
| (e) | Calcium stearate | 7 | 7 | 7 | 7 | 7 | 7 | 7 | 7 | 7 | 7 | 7 | — | 7 | 7 | 20 | 1 |
| (f) | Paraffin | 4 | — | — | 4 | — | — | — | — | — | — | — | — | — | — | — | — |
| (f) | Stearamide | 11 | 15 | 15 | 11 | 15 | 15 | 15 | 15 | 15 | 15 | 15 | 15 | — | 15 | 15 | 1 |
| (g) | Surface smoothness | 150 | 150 | 150 | 40 | 150 | 150 | 150 | 150 | 150 | 40 | 150 | 150 | 150 | 150 | 150 | 150 |
| | Sticking | | | | | | | | | | | | | | | | |

Table 1-continued

| Run and sample No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | Within the scope of this invention | | | Not within the scope of this invention | | | | | | | | | | | | |
| (× 10² g) | 1.1 | 1.1 | 1.1 | 1.2 | 1.8 | 1.9 | 2.0 | 2.0 | 1.8 | 1.8 | 2.5 | 1.6 | 1.7 | 1.5 | 2.3 | 2.0 |
| Resistance to residue | ◎ | ◎ | ◎ | Δ | ○ | ○ | Δ | ○ | ○ | Δ | X | ○ | ○ | X | X | Δ |
| Anti-abrasion | ◎ | ◎ | ○ | ○ | ◎ | ◎ | ◎ | ◎ | Δ | X | ◎ | ◎ | ◎ | ◎ | ◎ | ◎ |
| Resistance to pressure-sensitive development of color | ◎ | ○ | ○ | ○ | ○ | ○ | ○ | ○ | Δ | Δ | Δ | ○ | Δ | Δ | Δ | Δ |
| Shelf life | ○ | ○ | ○ | ○ | ○ | Δ | Δ | Δ | ○ | ○ | ○ | ○ | ○ | ○ | ○ | ○ |
| Color density | ◎ | ◎ | ◎ | X | ○ | ○ | ◎ | ○ | ○ | X | ◎ | ◎ | ◎ | ◎ | ◎ | ◎ |
| Overall rating | ◎ | ○ | ○ | Δ | Δ | Δ | Δ | Δ | Δ | X | X | Δ | X | X | X | X |

Note:
Resistance to residue: Degree of residue build-up on a thermal head after a long-run test.
Anti-abrasion: Degree of abrasion of the head after a long-run test.
Resistance to pressure-sensitive development of color: Degree of color development when scratched with the nail.
Color density: Density of developed color and print quality when tested with a thermal printer.
Shelf life: Degree of development of ground color after the specimen has been kept at 50° C. for one week.
Rating:
◎Excellent
○ Good
Δ Fair (nearly unsuitable for practical use in the majority of cases)
X Poor (unsuitable for practical use)
Overall rating: Evaluation of overall performance characteristics, priority being given to antisticking quality.
Styrite CM-1: Ammonium salt of partial ester of styrene-maleic anhydride copolymer; made by Daido Kogyo Co.
SBR Dow 636: Carboxyl-modified styrene-butadiene latex; made by Dow Chemical Co.

EXAMPLE 5

A sample of thermosensitive recording paper was obtained in the same manner as in Example 1, except that methylenebisstearamide, potato starch, and carboxymethylcellulose were used in place of the stearamide, wheat starch, and Malon MS-20, respectively. The recording paper thus obtained showed substantially no sticking, residue build-up on the head, nor abrasion of the head when tested by use of a thermal printer.

Example 6

| | |
|---|---|
| Liquor A | |
| 3-Diethylamino-7-chlorofluorane | 4 g |
| 5-% Aqueous solution of hydroxyethylcellulose (HEC) | 4 g |
| Water | 8 g |
| Liquor B | |
| 4,4'-(1-methyl-n-hexylidene) diphenol | 20 g |
| Calcium stearate | 10 g |
| 5-% Aqueous solution of HEC | 30 g |
| Water | 60 g |

The liquors A and B were separately ground in a ball mill for 2 days to disperse the ingredients. The ground liquors A and B were thoroughly mixed with 150 g of 20-% aqueous solution of ethanolamine salt of a styrene-maleic anhydride copolymer, 60 g of 50-% aqueous dispersion of talc, and 15 g of 20-% aqueous emulsion of a paraffin wax to prepare a thermosensitive coating composition. The coating composition was applied on a sheet of paper having a basis weight of 50 g/m² at an application rate of about 7 g/m² on dry basis. The coated sheet was dried and treated by means of a super-calender to obtain a thermosensitive recording paper having a Bekk smoothness of 250 seconds. This recording paper was also excellent in red color development.

Example 7

| | |
|---|---|
| Liquor A | |
| 3-Diethylamino-6-methyl-7-anilinofluorane | 4 g |
| 5-% Aqueous solution of HEC | 4 g |
| Water | 8 g |
| Liquor B | |
| Bisphenol-A | 20 g |
| Stearamide | 10 g |
| Zinc stearate | 5 g |
| Microcrystalline wax 220 | 2 g |
| 5-% Aqueous solution of HEC | 20 g |
| Water | 40 g |

The liquors A and B were separately ground in a ball mill for 2 days to disperse the ingredients. The ground liquors A and B were thoroughly mixed with 80 g of 20-% aqueous solution of Scripset 520 (ammonium salt of a styrene-maleic anhydride copolymer manufactured by Monsanto Chemical Co.) and 60 g of 50-% aqueous dispersion of rice starch. The resulting mixture was applied on a sheet of paper having a basis weight of 50 g/m² at an application rate of 10 g/m² on dry basis. The coated sheet was dried and treated on a machine calender to obtain a thermosensitive recording paper having a Bekk smoothness of 120 seconds. The recording paper obtained was found excellent for use in thermal printing, similarly to that obtained in Example 1, and, moreover, the coating layer showed no sign of peeling after immersion in water, because it had been made water-resistant.

Example 8

| | |
|---|---|
| Liquor A | |
| CVL | 4 g |
| 5-% Malon MS-20 aqueous solution | 4 g |
| Water | 8 g |
| Liquor B | |
| Bisphenol-A | 20 g |
| Calcium stearate | 7 g |
| Methylol amide wax | 11 g |
| 5-% Malon MS-20 aqueous solution | 38 g |
| Water | 76 g |

The liquors A and B were separately ground in a ball mill for 2 days to disperse the ingredients. The ground liquors A and B were mixed with 112 g of 20-% aqueous solution of Malon MS-20, 80 g of 50-% aqueous dispersion of wheat starch, and 20 g of 20-% aqueous emulsion of a paraffin wax. To the resulting mixture was added 8 cc of 10-% aqueous solution of 1,2-bis(2,3-epoxypropoxy)ethane to prepare a thermosensitive coating composition. The coating composition was applied on a sheet of paper having a basis weight of 50 g/m$^2$ at an application rate of about 10 g/m$^2$ on dry basis. The coated paper was dried and super-calendered to obtain a thermosensitive recording paper having a Bekk smoothness of 200 seconds. The recording paper was found excellent for use in thermal printing and water-resistant.

Example 9

| | |
|---|---|
| Liquor A | |
| 3-Piperidino-6-methyl-7-anilino-fluoran | 4 g |
| 5-% Aqueous solution of HEC | 4 g |
| Water | 8 g |
| Liquor B | |
| Bisphenol-A | 20 g |
| Calcium stearate | 5 g |
| Amide HT (a mixture of palmitylamide, stearylamide, and oleylamide; a product of Lion Armour Co.) | 10 g |
| 5-% Aqueous solution of Malon MS-20 | 35 g |
| Water | 70 g |

The liquors A and B were separately ground in a ball mill for 2 days to disperse the ingredients. The ground liquors A and B were mixed with 100 g of 20-% aqueous solution of Malon MS-20, 80 g of 50-% aqueous dispersion of wheat starch, and 10 g of 20-% polyethylene wax emulsion to obtain a thermosensitive coating composition. The coating composition was applied on a sheet of paper having a basis weight of 50 g/m$^2$ at an application rate of 0.4 g/m$^2$ in terms of 3-piperidiono-6-methyl-7-anilinofluorane. The coated sheet was dried and super-calendered to obtain a thermosensitive recording paper having a Bekk smoothness of 200 seconds, which was found excellent for use in thermal printing.

What is claimed is:

1. A thermosensitive recording material composed of a coating composition applied as a single layer on a paper, synthetic resin film or textile cloth support, which coating composition comprises (a) a chromogenic compound, (b) an organic acid which melts or vaporizes at room temperature or higher and reacts with the chromogenic compound to develop color, (c) a water-soluble binder containing a carboxyl group and having a softening point of 200° C. or higher, (d) an infusible filler, (e) a metal salt of a higher fatty acid, and (f) a wax, the weight ratio of (a) to (b) being from 1/1 to 1/20, the amount of (c) being 15 to 50% by weight based on the total solids content of the composition, the amount of (d) being 30 to 300% by weight based on the total weight of (a) and (b), the total amount of (e) and (f) being 10 to 200% by weight based on the total amount of (a) and (b), the weight ratio of (e) to (f) being from 1/10 to 10/1, said recording material having a Bekk surface smoothness of 100 to 500 seconds.

2. A thermosensitive recording material according to claim 1, wherein (e) the metal salt of a higher fatty acid is a polyvalent metal salt of stearic acid.

3. A thermosensitive recording material according to claim 1, wherein (f) the wax is a wax of the higher fatty acid amide type.

4. A thermosensitive recording material according to claim 1, wherein (f) the wax is a combination of a wax of the higher fatty acid amide type and a petroleum-based wax.

5. A thermosensitive recording material according to claim 1, wherein (d) the filler is a finely powdered starch.

6. A thermosensitive recording material according to claim 2, wherein (d) the filler is a finely powdered starch.

7. A thermosensitive recording material according to claim 6, wherein (f) the wax is a wax of the higher fatty acid amide type.

8. A thermosensitive recording material according to claim 6, wherein (f) the wax is a combination of a wax of the higher fatty acid amide type and a petroleum-based wax.

9. A thermosensitive recording material according to claim 1, wherein (c) the water-soluble binder is at least one member selected from the group consisting of styrene-maleic anhydride copolymers, carboxymethylcelluloses, and carboxyl-modified starches.

10. A thermosensitive recording material according to claim 6, wherein (c) the water-soluble binder is at least one member selected from the group consisting of styrene-maleic anhydride copolymers, carboxymethylcelluloses, and carboxyl-modified starches.

11. A thermosensitive recording material according to claim 7, wherein (c) the water-soluble binder is at least one member selected from the group consisting of styrene-maleic anhydride copolymers, carboxymethylcelluloses, and carboxyl-modified starches.

12. A thermosensitive recording material according to claim 8, wherein (c) the water-soluble binder is at least one member selected from the group consisting of styrene-maleic anhydride copolymers, carboxymethylcelluloses, and carboxyl-modified starches.

13. A thermosensitive recording material according to claim 1, wherein (a) the chromogenic compound is a leuco dyestuff having a lactone ring.

14. A thermosensitive recording material according to claim 1, wherein (b) the organic acid is a bisphenol compound.

15. A thermosensitive recording material according to claim 14, wherein (b) the organic acid is at least one member selected from the group consisting of 4,4'-isopropylidenediphenol and 4,4'-(1-methyl-n-hexylidene) diphenol.

16. A thermosensitive recording material according to claim 1, wherein the supporting material is selected from paper or synthetic resin film.

17. A thermosensitive recording material according to claim 1 wherein the supproting material is paper.

18. A thermosetting recording material according to claim 1 wherein (a) is a leuco dyestuff having a lactone ring, (b) is a bisphenol compound, (c) is at least one member selected from the group consisting of styrene-maleic anhydride copolymers, carboxymethylcelluloses, and carboxyl-modified starches, (d) is a finely powdered starch, (e) is a polyvalent metal salt of a higher fatty acid, and (f) is a wax of the higher fatty acid amide type, said recording material having a Bekk surface smoothness of 100 to 500 seconds.

19. A thermosensitive recording material according to claim 18, wherein (f) the wax is a combination of a wax of the higher fatty acid amide type and a petroleum-based wax.

* * * * *